United States Patent [19]
Watanabe

[11] Patent Number: 5,009,020
[45] Date of Patent: Apr. 23, 1991

[54] LIGHT-PASSING DECORATIVE OBJECT

[75] Inventor: Toshiharu Watanabe, Minokamo, Japan

[73] Assignee: Sakae Riken Kogyo Co., Ltd., Japan

[21] Appl. No.: 273,607

[22] Filed: Nov. 21, 1988

[30] Foreign Application Priority Data

Nov. 25, 1987 [JP] Japan .................. 62-179158[U]

[51] Int. Cl.⁵ .......................................... G09F 13/00
[52] U.S. Cl. ..................................... 40/547; 40/591;
362/32; 428/203; 428/161
[58] Field of Search ............... 40/547, 546, 591, 541;
362/32; 340/815.07, 815.31; 428/203, 204, 209,
161, 164

[56] References Cited

U.S. PATENT DOCUMENTS

| | | | |
|---|---|---|---|
| 1,582,676 | 4/1926 | Godley | 40/556 |
| 3,262,224 | 7/1966 | Hardesty | 40/546 |
| 3,264,769 | 8/1966 | Hardesty | 40/546 |
| 3,718,814 | 2/1973 | Van Slyke | 362/32 |
| 4,126,855 | 11/1978 | Alms et al. | 40/564 |
| 4,128,332 | 12/1978 | Rowe | 362/32 |
| 4,141,058 | 2/1979 | Mizohata et al. | 362/347 |
| 4,234,907 | 11/1980 | Daniel | 362/103 |
| 4,415,612 | 11/1983 | Hall et al. | 428/203 |
| 4,443,832 | 4/1984 | Kanamori et al. | 362/61 |
| 4,745,525 | 5/1988 | Sheehy | 362/80 |
| 4,775,559 | 10/1988 | Kanamori | 40/591 |

FOREIGN PATENT DOCUMENTS

| | | | |
|---|---|---|---|
| 2703525 | 8/1978 | Fed. Rep. of Germany | 40/547 |
| 0115097 | 9/1979 | Japan | 40/547 |

Primary Examiner—James R. Brittain
Assistant Examiner—Brian K. Green
Attorney, Agent, or Firm—Larson and Taylor

[57] ABSTRACT

A light-passing decorative object made of light-passing synthetic resin is characterized in that a film piece on which letters, patterns or the like are displayed in such a manner as to be seen therethrough is intimately bonded to a notch-cut back side of a light-passing decorative member. The decorative member is provided a back side thereof with a face brightening device. The face brightening device has optical fibers arranged in parallel relation. The optical fibers being provided with a notched portion so as to be brightened. One ends of the optical fibers are bundled to form a bundle portion and attached to a coupler for coupling to a light source.

8 Claims, 6 Drawing Sheets

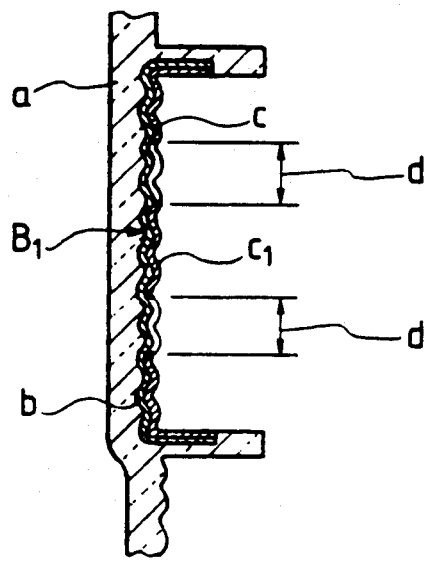
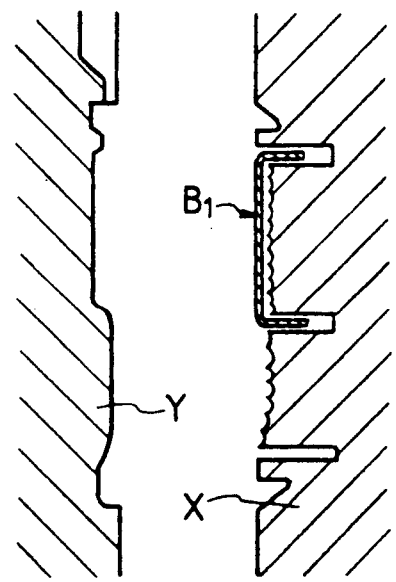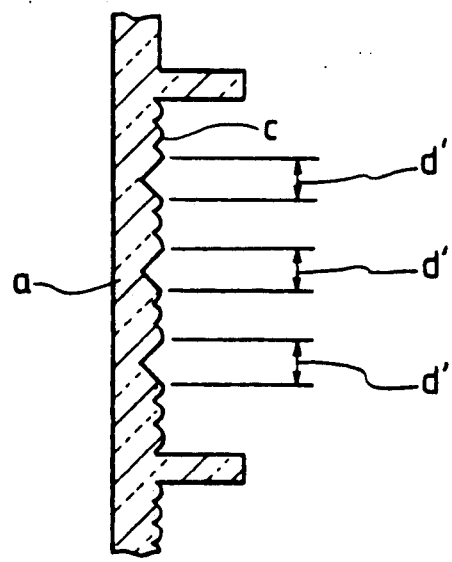

LIGHT-PASSING DECORATIVE OBJECT

BACKGROUND OF THE INVENTION

As the prior art for applying letters, patterns or the like on a notch-cut back side of a decorative object, there is U.S. patent application Ser. No. 07/174,351 filed by the present applicant on Mar. 28, 1988. This invention relates to an improvement thereof.

In general, as means for illuminating (or brightening) various decorative panels such as, for example, rear panel garnishes or decorative objects such as, for example, top marks, emblems and the like, there can be cited (1) those comprising a combination of an incandescent lamp and a prism, (2) those in which EL (electroluminiscence) is used in the decorative panels or decorative members, or (3) those in which LED is used. However, all of them have the shortcoming in that a large space is occupied in automobiles or motorcars. Especially, in (1), there is such a problem as that they generate heat and, in (2), there is such a problem as that an inverter is required. Particularly, in such a conventional decorative panel as in (1), there is a problem that a uniform illuminating or brightening surface cannot be obtained.

SUMMARY OF THE INVENTION

This invention relates to a light-passing decorative object, in which letters, patterns or the like applied onto various decorative panels or decorative members attached to automobiles, for example, are illuminated (or brightened) and displayed even at night or in a dark place because light passes through the decorative panels or decorative members from a back side to a front side thereof.

The light-passing decorative object made of a colorless transparent or colored semitransparent light-passing synthetic resin is characterized in that a film piece on which letters, patterns or the like are displayed in such a manner as to be seen therethrough is intimately bonded to a notch-cut back side of a decorative member, a back side thereof being provided with a face brightening device comprising optical fibers arranged in parallel relation, the optical fibers being provided at a back side thereof with a notched portion so as to be brightened, one ends of the optical fibers being bundled to form a bundle portion and attached to a coupler for coupling to a light source.

A first object of the present invention is to provide a light-passing decorative object, in which light-passing letters, patterns or the like are applied onto a notch-cut back side of a light-passing decorative member and a rear side thereof is provided with a face brightening device adapted to brightening the letters, patterns or the like.

A second object of the present invention is to provide a safe and space-saving light-passing decorative object, in which letters, patterns or the like are applied onto a notch-cut back side of a light-passing decorative member, and the letters, patterns or the like are provided at rear sides thereof with a face-brightening device coupled to a light source which is located at a different place and adapted to brighten the letters, patterns or the like.

These objects can be achieved by a light-passing decorative object which constitutes the present invention. Specific embodiments of the light-passing decorative object will be illustrated in the accompanying drawings and described in the following detailed description of the embodiment.

It should be understood that various modifications within the spirit of the present invention are included in claims appended hereto.

BRIEF DESCRIPTION OF THE DRAWINGS

FIG. 4 is an enlarged view showing a portion enclosed by a two-dot and dash loop line of FIG. 3;

FIG. 5 is a sectional view showing a film piece set in a molding die;

FIG. 6 is a vertically-sectioned view showing one embodiment of a molding product of a panel garnish;

DETAILED DESCRIPTION OF THE EMBODIMENT

Figure 1:
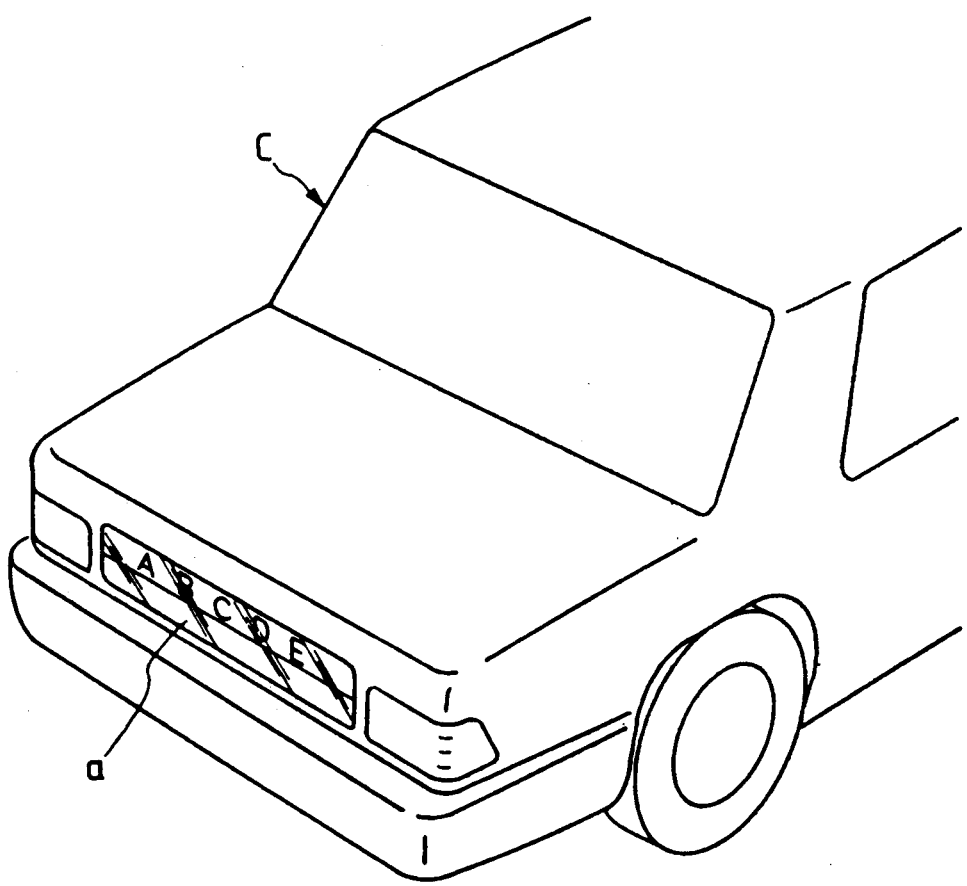
FIG. 1 shows the appearance of an automobile to which a panel garnish of the present invention is attached.
Figure 2:
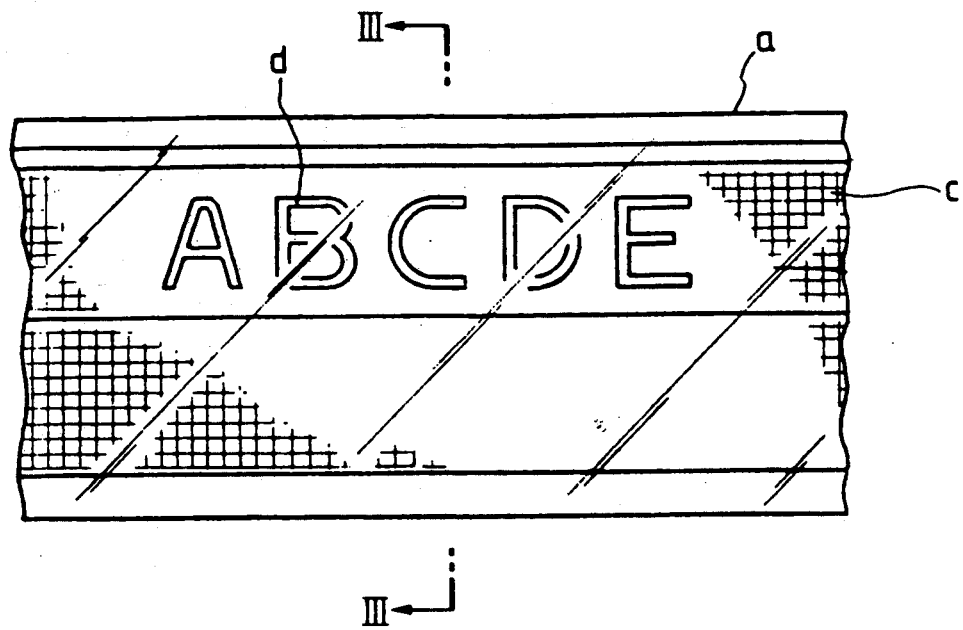
FIG. 2 is an enlarged front view showing a part of the panel garnish of FIG. 1.
Figure 3:
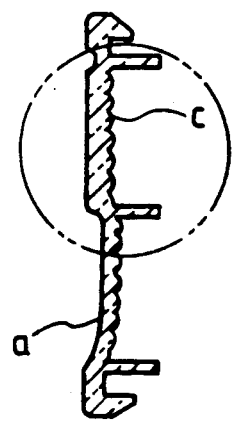
FIG. 3 is a vertically-sectioned view taken along line III—III' of FIG. 2.

FIG. 1 shows a rear panel garnish (a) attached to an automobile (C). The rear panel garnish (a) is made of a colorless transparent or a colored semitransparent light-passing synthetic resin. The rear panel garnish (a) has a flat front side but a notch-cut (or fish-eye cut) back side (c) as shown in FIG. 2. FIG. 3 is a section of a central portion of FIG. 2, and FIG. 4 is an enlarged view showing the portion included in a two-dot and dash loop line of FIG. 2. As apparent from FIG. 4, the notch-cut back side (c) of the rear panel garnish (a) is provided with a transparent or semitransparent film material (b). On this film material (b) a film piece ($B_1$) with a no-light-passing layer ($c_1$) applied thereon by hot stamping, painting, printing or the like only excluding the area of the light-passing letters, patterns or the like is formed through a simultaneous internal die molding process.

The simultaneous internal die molding process is carried out in such a manner as that the film piece ($B_1$) with its both ends bent, as shown in FIG. 5, is set in a movable die (X), and then the movable die (X) is secured to a fixed die (Y), and thereafter the synthetic resin material is injected therein.

As is shown in FIG. 6, the portions (d') of letters, patterns or the like may be engraved further internally from the notch-cut back side (c) of the panel garnish (a).

Various kinds of film pieces which are set in the movable die (X) will now be described.

Figure 7A:
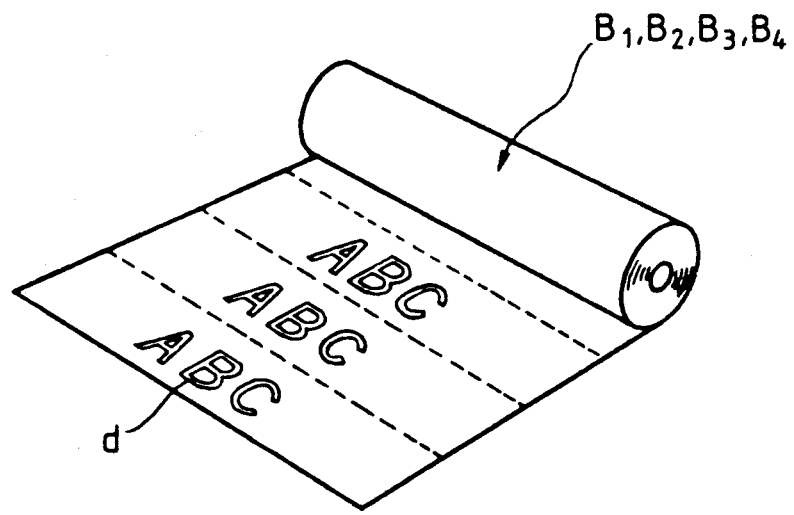
FIG. 7a is a perspective view showing a sheet of continuously formed film.

FIG. 7a shows a sheet of continuously formed film consisting of film pieces ($B_1$), ($B_2$), ($B_3$) and ($B_4$). The thickness of the film material (b) used for the same is determined with reference to the depth of the back side notch-cut pattern of the rear panel garnish, etc. but preferably within a range of 0.1 ~ 1.0 mm in most cases.

Figure 7B:
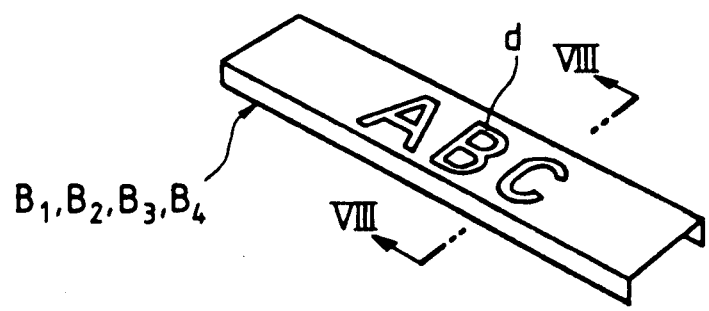
FIG. 7b is the film piece bent along its rims.

FIG. 7b shows a film piece ($B_1$), ($B_2$), ($B_3$) or ($B_4$) separated from the sheet of continuously formed film.

Figure 8:
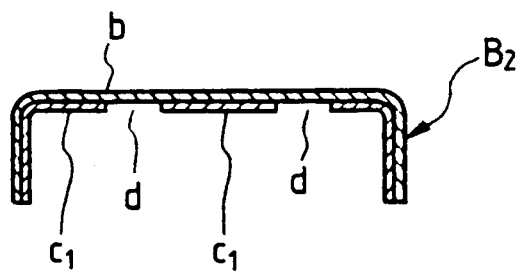
FIG. 8 is a cross sectional view of one embodiment of the film piece taken along line VIII—VIII' of FIG. 7b.

Several examples of such film pieces will be described next. FIG. 8 shows a film piece ($B_2$) comprising letters, patterns or the like (d) engraved in one side of the film material (b) and a no-light-passing layer ($c_1$) formed thereon.

Figure 9:
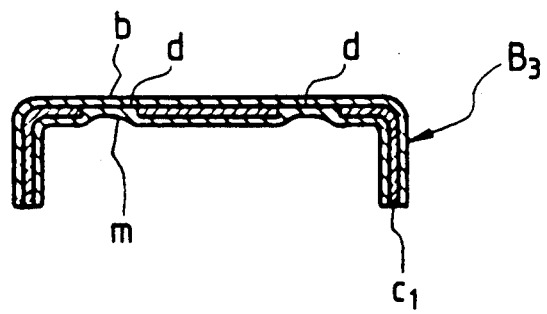
FIG. 9 is a cross sectional view of another embodiment thereof taken along line VIII—VIII' of FIG. 7b.

FIG. 9 shows a film piece ($B_3$) comprising a light-passing metallic film (m) formed on the film piece ($B_2$) of FIG. 8 by vacuum deposition or sputtering or hot stamping.

Figure 10:
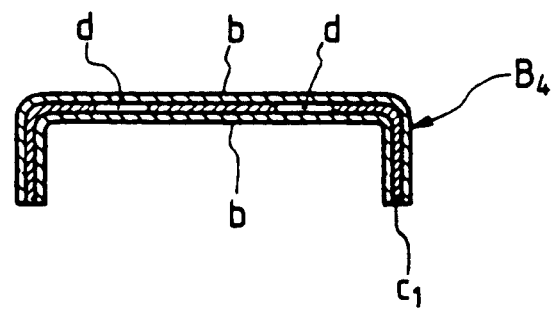
FIG. 10 is a cross sectional view of still another embodiment thereof taken along line VIII—VIII' of FIG. 7b.

The example of FIG. 10 is a film piece ($B_4$) comprising a film material (b), and another film material (b) laminated thereon with a no-light-passing printed layer ($c_1$) sandwiched therebetween, in order to prevent the flowing of ink applied to the film material (b) which is occurable at the time of simultaneous molding after the film material (b) is set in the molding die. That is, the figure shows an example in which another film material (b) (second film material) (b) is intimately bonded to the back side of the no-light-passing layer ($c_1$) formed of a no-light-passing paint (ink) or the like so that the paint (ink) will not flow with the molding die due to injection pressure, injection speed and the like at the time of molding.

And, these film pieces ($B_1$), ($B_2$), ($B_3$) and ($B_4$) are formed in a sheet of continuous formed film as shown in FIG. 7a, and after cutting in a desired size, both ends of the film piece in the longitudinal direction are bent as shown in FIG. 7b to prepare the film pieces ($B_1$), ($B_2$), ($B_3$) and ($B_4$) which are set in the molding die.

In these examples, when the light-passing portion, i.e., the letters, patterns or the like are not illuminated, the letters, patterns or the like merely permit light to pass therethrough. If a color filter, a metallic film, a light-passing filter or the like is disposed between a light source and the decorative panel, there can be obtained a much more beautiful decorative panel.

In the example of FIG. 9 which has the light-passing metallic film (m), when the pattern (d) is not illuminated, the letters, patterns or the like (d) having a metallic glossiness are seen. If the pattern (d) is illuminated at that time, the light passes through the metallic film (m).

Figure 11:
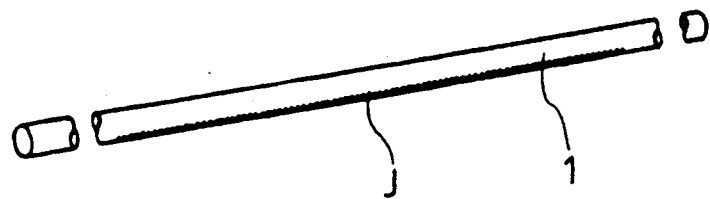
FIG. 11 is a perspective view of an optical fiber.
Figure 12:
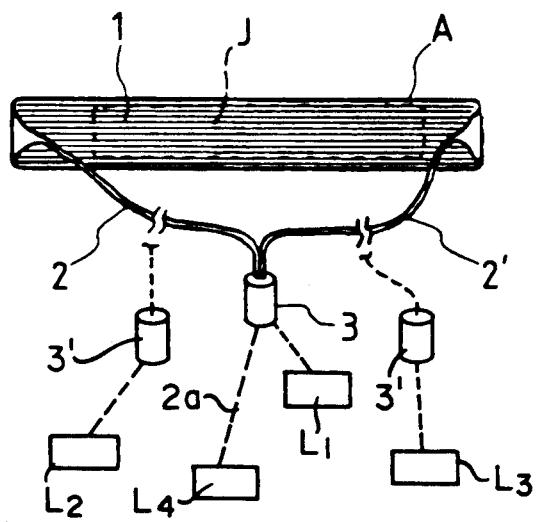
FIG. 12 is a perspective view of a face-brightening device of the present invention.

Such obtained rear panel garnish (a) is provided with optical fibers (1) [0.1 ~ 3.0$\phi$] flatly arranged on its back side, as shown in FIGS. 11 and 12, to form an illuminating surface of a desired size, and either the front or the rear surface thereof is provided with a notched portion (J) [FIG. 11 shows an example in which the rear surface is provided with the notched portion (J)], and in this example, both ends of the optical fibers (1) are bundled to form bundle portions (2), (2'), thus constituting the face brightening device (A). The face brightening device (A) is attached with a coupler (3) for coupling to a light source ($L_1$). The thickness of the face brightening device (A) is approximately 0.1 ~ 1.5 mm.

This manner of notching the optical fibers 1 is carried out in such a way as that a press on which the recesses are formed with shape, angle and depth as to meet the brightness of the area to be brightened is pushed against the optical fibers 1 with heat and pressure.

In the face brightening device (A), the coupler (3) may be attached to only one bundle portion (2), or otherwise, both the bundle portions (2) and (2') may be provided with a coupler 3', respectively and they may be coupled to different light sources ($L_2$), ($L_3$).

In this embodiment, the coupler (3) attached with the bundle portions (2) and (2') at both ends of the optical fibers (1) may be connected to another light source (second light source ($L_4$)) which is separately located at a distant place, through other optical fibers (second optical fibers (2a)). As this second light source ($L_4$) separately located at a distant place, there may be employed, for example, a rear combination lamp. Because of the light source being separately located at a distant place, there can be provided a considerably space-saving rear panel garnish (a) unlike the prior art in which an illumination lamp, wiring, etc. are disposed in proximate relation. Furthermore, by virtue of the foregoing arrangement, there is no fear of forming a short circuit because electric wiring is not present and thus safe. And, in either case, if the light source is turned on, light is guided by the optical fibers (1), irregularly reflected by the notched portion (J) of the face brightening device (A) and irradiated, thereby light passes through the letters, patterns or the like (d).

Figure 13:
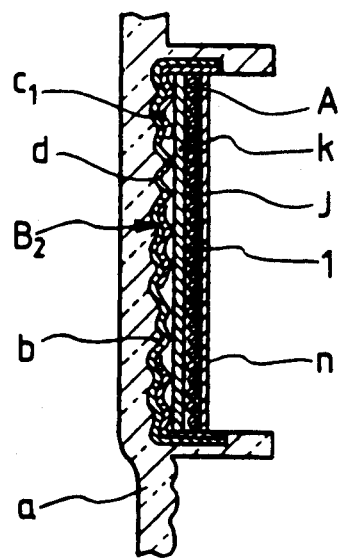
FIG. 13 is a vertically-sectioned view of one embodiment of the panel garnish of the present invention.

FIG. 13 shows one example in which the film piece ($B_2$) is provided at its back side with a color filter (K), and the color filter (K) is provided at its back side with the face-brightening device (A) comprising the optical fibers (1), and the face-brightening device (A) is provided at its back side with a reflecting film (n), and all of the constituent parts are fixed together by an adhesive agent or a fixing metal piece. In this example, desired letters, patterns or the like (d) can particularly clearly be displayed.

In the foregoing embodiments, although a light-passing decorative object of the present invention is applied to a rear panel garnish of an automobile, it can likewise effectively be applied to a rear combination lamp, an emblem, a top mark, a side protector, a front grill or the like.

What is claimed is:

1. A light-passing decorative object comprising:
   a light-passing decorative member made of a light-passing synthetic resin, said decorative member including a notch-cut back side;
   a film piece having indicia which is viewable through the film piece, the film piece being bonded to the notch-cut back side of the decorative member; and
   a face brightening device which illuminates the film piece, the brightening device including (a) a plurality of optical fibers having a bundled end, (b) a coupler for coupling the bundled end of the optical fibers to a light source, and (c) an illuminating surface attached to the decorative member with the film piece between the illuminating surface and the back side of the decorative member, the illuminating surface being formed by the optical fibers which are arranged in parallel relation and provided with notched portions through which light conducted through the optical fiber passes and illuminates the film piece, the indicia being formed by openings in a no-light-passing layer applied on the film piece and wherein a light-passing metallic layer is attached to the film piece.

2. A light-passing decorative object as claimed in claim 1 characterized in that the optical fibers have a second bundled end attached to the coupler for coupling the second bundled end to a light source.

3. A light-passing decorative object as claimed in claim 1 characterized in that the optical fibers have a second bundled end and a second coupler to which the second bundled end is attached for coupling to a second light source.

4. A light-passing decorative object as claimed in claim 1, characterized in that the openings of the no-light-passing layer are punched out from the no-light-passing layer.

5. A light-passing decorative object as claimed in claim 1, characterized in that a second light-passing film piece overlaps the no-light-passing layer so that the no-light-passing layer is sandwiched between the first mentioned film piece and the second film piece.

6. A light-passing decorative object comprising:
   a light-passing decorative member made of a light-passing synthetic resin, said decorative member including a notch-cut back side;
   a film piece having indicia which is viewable through the film piece, the film piece being bonded to the notch-cut back side of the decorative member; and
   a face brightening device which illuminates the film piece, the brightening device including (a) a plurality of optical fibers having a bundled end, (b) a coupler for coupling the bundled end of the optical fibers to a light source, and (c) an illuminating surface attached to the decorative member with the film piece between the illuminating surface and the back side of the decorative member, the illuminating surface being formed by the optical fibers which are attached in parallel relation and provided with notched portions through which light conducted through the optical fiber passes and illuminates the film piece, the indicia being formed by openings in a no-light-passing layer applied on the film piece and, wherein said face brightening device includes a reflecting film provided at a back side thereof.

7. A light-passing decorative object as claimed in claim 6, characterized in that said coupler is connected to a second light source through second optical fibers.

8. A light-passing decorative object as claimed in claim 7, characterized in that in the area of the film piece adjacent the indicia, the notch-cut back side has portions which are engraved further internally from the remainder of the notch-cut back side.

* * * * *